(12) United States Patent
Renner

(10) Patent No.: US 7,774,165 B2
(45) Date of Patent: Aug. 10, 2010

(54) STATE MONITORING OF MACHINES AND TECHNICAL INSTALLATIONS

(76) Inventor: Peter Renner, Heiligenstock 2, D-51515 Kurten (DE)

(*) Notice: Subject to any disclaimer, the term of this patent is extended or adjusted under 35 U.S.C. 154(b) by 0 days.

(21) Appl. No.: 11/843,796

(22) Filed: Aug. 23, 2007

(65) Prior Publication Data

US 2008/0052040 A1 Feb. 28, 2008

(30) Foreign Application Priority Data

Aug. 26, 2006 (EP) .................................. 06017842

(51) Int. Cl.
*G06F 15/18* (2006.01)
*G06F 17/00* (2006.01)

(52) U.S. Cl. .................. 702/182; 702/183; 702/187; 706/12; 706/60

(58) Field of Classification Search ............. 702/182, 702/183, 187, 188
See application file for complete search history.

(56) References Cited

U.S. PATENT DOCUMENTS

| | | | | |
|---|---|---|---|---|
| 5,774,633 A | * | 6/1998 | Baba et al. ............. | 706/25 |
| 6,327,550 B1 | * | 12/2001 | Vinberg et al. ........... | 702/186 |
| 2004/0098233 A1 | | 5/2004 | Renner .................. | 702/189 |
| 2004/0135534 A1 | * | 7/2004 | Cullen .................. | 318/609 |
| 2004/0250166 A1 | * | 12/2004 | Dahlquist et al. ......... | 714/37 |
| 2005/0033464 A1 | | 2/2005 | Nguyen ................. | 700/108 |
| 2005/0137764 A1 | * | 6/2005 | Alvarez-Troncoso et al. | 701/36 |
| 2005/0171705 A1 | * | 8/2005 | Renner .................. | 702/33 |
| 2006/0195201 A1 | * | 8/2006 | Nauck et al. ............. | 700/30 |
| 2006/0241927 A1 | * | 10/2006 | Kadambe et al. .......... | 703/20 |
| 2007/0038838 A1 | * | 2/2007 | Greis et al. .............. | 711/207 |
| 2007/0150220 A1 | | 6/2007 | Bode .................... | 702/84 |

FOREIGN PATENT DOCUMENTS

| | | |
|---|---|---|
| EP | 1479984 | 11/2004 |
| EP | 1533669 | 5/2005 |
| EP | 1 542 108 | 6/2005 |

* cited by examiner

*Primary Examiner*—Hal D Wachsman
(74) *Attorney, Agent, or Firm*—Joseph T. Guy; Nexsen Pruet, LLC

(57) ABSTRACT

Provided is a method for monitoring measurement data by way of measurement channels. The measurement channels are processed in a plurality of time series of state values with mutually different time bases. Limit value ranges are ascertained in a learning phase and monitoring-related steps are triggered in a monitoring phase when limit values are exceeded. A good value extent is calculated for a time series with an upper and a lower limit value, with the inclusion of a limit value range which is predetermined in the learning phase and a state base value of the time series, which is determined in the monitoring phase.

23 Claims, 9 Drawing Sheets

STATE MONITORING OF MACHINES AND TECHNICAL INSTALLATIONS

CROSS-REFERENCE TO RELATED APPLICATION

The present invention claims priority to pending application EP 06017842.3 filed Aug. 26, 2006.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISK

Not Applicable

BACKGROUND OF THE INVENTION (1) Field of the Invention

The invention describes a method of monitoring technical processes in machines, installations or the like and a corresponding expert system for carrying out such a method.

(2) Description of Related Art Including Information Disclosed Under 37 CFR 1.97 and 1.98

BRIEF SUMMARY OF THE INVENTION

Technical processes require a monitoring procedure in order to initiate necessary maintenance measures in good time so that consequential damage or total failure and the long stoppage times that they entail can be avoided. In general it is to be noted that changes to machines, apparatuses and installations are frequently caused by wear, corrosion, deposits, blockage and fouling. In general operational power-oriented or operating time-oriented maintenance of machines/installations is still effected nowadays. That however suffers from the disadvantage that then maintenance operations are frequently carried out, which at that time are not yet necessary. Furthermore, when such a procedure is involved, failures can nonetheless not be excluded, which are based for example on material defects which would have made it necessary to effect maintenance of the installation or the machine outside the usual maintenance interval.

Early approaches for state-oriented maintenance of machines, installations and so forth are known in this area. One of those known methods is based on carrying out mathematical calculations by means of neuronal networks. That method has hitherto not yet gone beyond the laboratory stage and in that respect does not represent a practicable solution. European patent application EP 1 403 750 A1 describes a system for tracking changes in technical processes, for implementing state-oriented maintenance or overhaul. In that system measurement data are detected by way of measurement chains, wherein mutually dependent measurement parameters are combined together to afford reference groups and validity conditions are defined for the measurement data, and wherein measurement data are used for evaluation only when the validity conditions are satisfied. In that case measurement data of the reference groups are linked to reference parameters. The system monitors the variation in respect of time of the measurement data and detects therefrom changes which for example point to the threat of failure of a component. European patent application EP 1 533 669 A1 concerns a further monitoring system of that kind, wherein the measurement channels of mutually independent measurement parameters are combined together to afford reference groups.

The systems disclosed in the above-mentioned European patent applications represent an initial practicable approach for state-oriented maintenance or overhaul. Those systems are based on the realisation that external influences which are not attributed to a change in the process itself and which are reflected in the measurement data act on technical processes. The wear-governed permanent changes which are due to wear, corrosion, deposits or the like are separated from external influences which act on the machines/installations and thus on the technical process so that in that way it is possible to detect the wear-governed permanent changes which in turn can be used to produce limit values. In that fashion it is possible to detect the state of the machines/installations substantially independently of the external influences, and that is a necessary prerequisite for particularly good implementation of state-oriented maintenance.

The described external influences on the technical process are detected automatically independently of the cause of their emergence and are taken into account when the data is evaluated. There are many different sources of such external influences. Depending on the respective technical process involved that can be caused for example by the night-day cycle, the month cycle or also by the annual cycle of the Earth, in regard to fluctuations in light and/or temperature. In addition other sources of interference such as for example the fact that a streetcar is travelling past in the proximity of the machine/installation under consideration, in the case of vibration-sensitive processes, can exert influences on the process which are reflected in the measurement results. Those influences can in that respect involve periods in the seconds range, but also in the range of hours, days, months or years. Furthermore changes due to operation such as a change in load in the case of a machine can also lead to a change in the measurement results which are not to be attributed to a deterioration in the machine/installation.

In the case of the described systems in the state of the art measurement data are detected by way of measurement channels and the measurement data of a measurement channel are processed in a plurality of time series of state values involving mutually different time bases, wherein limit value ranges are ascertained in a learning phase and monitoring-related steps are triggered in a monitoring phase when good limit values are exceeded.

The object of the invention is to further improve the monitoring of such technical processes, in particular to still more accurately differentiate the attrition-governed, ageing-governed and wear-governed influences, that is to say the influences which are governed by operation, on the measurement data detection, from the external, measurement value-falsifying influences.

In regard to the method the method according to the invention is distinguished in that in the monitoring phase a good value extent in respect of the state values is calculated for a time series with an upper and a lower limit value, with the inclusion of a limit value range which is predetermined in the learning phase and a state base value of the time series, which is determined in the monitoring phase.

Both the learning phase and also the monitoring phase can in that respect be carried out in a state of the technical process in which it is in a kind of static, that is to say steady-state operating phase. In accordance with the invention in the learning phase parameters are ascertained such as a limit value range which in the actual monitoring phase of the process are fixedly predetermined and are used for evaluation purposes. By virtue of the fact that the state base value of a time series is not fixedly predetermined but is always variably adapted, it is possible in accordance with the invention for the external or operating influences on the process and thus on the measurement values to be even better separated from the measurement value changes which are caused by procedures which are internal to the process such as wear, corrosion, deposits and so forth. In that respect the good value extent of the state values is always 'followed up' and adapted to the external conditions and influences. In that respect a time series includes a number of measurement values, measurement values which are compressed in respect of time, or data which were calculated from measurement values in another way. The values included in the time series are referred to hereinafter generally as state values. In addition the good value extent of a time series describes the range of values within which the state values must occur so that no fault situation is detected in relation to the state values. In that case the state values are referred to as good values.

It can be advantageous if the upper limit of the good value extent of a time series is calculated by adding half the limit value range which is predetermined in the learning phase, to the state base value of the time series. In the same fashion, the lower limit of the good value extent can be ascertained by subtracting half the limit value range from the state base value.

Measurement parameters in the measurement channels can be for example temperatures, pressures, currents, voltages, flows, rotary speeds, vibration amplitudes and so forth which are ascertained by way of associated sensors which in turn provide the measurement data for preparation and/or data processing. In general terms those measurement parameters can be any process, machine and/or installation parameters. The measurement data are now processed in a plurality of time series of state values with mutually different time bases. Such different time bases can be for example time intervals in seconds, minutes, hours, days, weeks, months or year scaling.

In that respect it may be advantageous if an individual time series of state values includes a predetermined number of values for establishing a test block and the state base value in the monitoring phase is calculated by data processing of at least two currently prevailing good values of the respective time series. Currently prevailing in that respect signifies that the good values in question are precisely currently prevailing members in the time series. The operation of ascertaining the state base value can be calculated for example by averaging of the currently prevailing maximum value and the currently prevailing minimum value of the time series or also by averaging of all good values of the time series. By virtue of the fact that the state base value of a time series, which establishes a kind of center line, depends on the currently prevailing state values, in that respect the good value extent of the time series is adapted to the external influences acting on the process such as the ambient temperature and also the operating influences which are not to be attributed directly to a deterioration in the machine/installation.

Particularly if a plurality of measurement channels are to be combined together or are to be prepared together for an evaluation operation, it may be advantageous if the good values of a time series are standardised to the state base value. In that case, the state base value can be subtracted from the respective good value and the resulting difference can be divided by half the limit value range of the time series. Such a calculation can be carried out for each time series. In that way all time series are on a base line of 0 and involve the limit values ±1 so that, in an individual graph representation, it is possible to specify a large number of time series of the most widely differing measurement channels with the same time base, independently of the magnitude of the respective measurement values or compressed measurement values which are both generally referred to as state values. The representation of such standardised values of one or more time series in a graph is referred to hereinafter as a standard value graph means.

It can be advantageous if the predetermined good value range of a time series takes account not only of the limit value range ascertained in the learning phase but also an adjustable offset. For example it may be advantageous if that good value range is calculated by addition of the limit value range ascertained in the learning phase, to an offset which is predetermined prior to the start of the monitoring phase. Taking account of that offset takes into consideration the situation where the learning phase used for ascertaining the limit value range is of a finite duration, which is as short as possible, for rapidly switching over into the monitoring phase, and insofar as the limit value range ascertained within the restricted period of time is under some circumstances greater in reality even in the event of the non-occurrence of process disturbances. In that respect misinterpretations and in particular false alarms are avoided by taking account of that offset. In that case the limit value range and the good value range of the state values differ by that offset. The standardisation procedure described in the preceding paragraph is then to be appropriately implemented.

It is desirable if the limit value range of a predetermined time series is established by the fluctuation width of the state values of the time series in the learning phase. That learning phase is identical to the monitoring phase in relation to the technical process as in this case also the process is in a quasi static, that is to say steady-state, operating phase. Such a phase can be distinguished for example in that an operating temperature or a rotary operating speed is attained. In the case of regulating procedures, by modifications to the reference value, firstly a dynamic phase which is not steady-state will occur and thereafter the regulated, quasi-static operating phase will come into effect. The term quasi-static is used here in order to express the fact that, even on a steady-state condition, further influencing factors such as change in loadings, ambient temperatures and so forth can constantly act on the process so that in that situation a pure static operating phase can never be achieved.

It is desirable if, in the learning phase, with respect to a predetermined measurement channel, a state value of the time series with the lowest time base is continuously ascertained and incorporated into the time series, in which case in the monitoring phase a good value of the time series, with the lowest time base, is continuously ascertained and incorporated into the time series. In that respect the designation good value describes a state value which is within the good value extent of the respective time series and thus does not represent a value exceeding the good value limits. Such a time series which is set to a fixed time range is identified as a test block.

So that, in the learning phase, starting from state values of a time series with a low time base, it is possible to ascertain a state value of a time series with a higher time base, it can be provided that such a state value is ascertained by statistical evaluation, in particular by averaging of state values of the time series with the lower time base, and is incorporated into the time series with the higher time base. Such averaging can include for example averaging of the state values of a time series or only a part thereof. In the same fashion it may be advantageous if, in the monitoring phase, a good value of a time series with a predetermined time base is ascertained by statistical evaluation, such as for example by averaging of good values of the time series with a lower time base, and is incorporated into the first-mentioned time series. In that way it is possible in principle to produce any time series (test blocks) which respectively ascertain the performance in relation to time of the technical process being monitored, within any time interval, for example the performance of the technical process or of the measurement parameters in the seconds range or also in the interval of a month. In that respect it can be provided that each individual time series has an independent state base value which, as described hereinbefore, is ascertained during the monitoring phase.

It is desirable if, when incorporating the freshly ascertained value, that is to say a state value, into the respective time series, the value which in respect of time is longest in the series is removed, if a number of incorporated values, which is predetermined for the respective time series, was reached. In the described fashion, the data set in the respective test block is adapted to the time changes in the process.

If the method according to the invention is in monitoring phase, state values which are outside the good value range are not incorporated into the corresponding time series, in an advantageous embodiment. In that respect those state values outside the good value extent of the time series are also not used for ascertaining state values in higher time series. The learning phase however usually does not involve predetermining a limit value range or a state value range and thus also not a good value range. Accordingly all state values are incorporated into the respective time series, independently of the value, insofar as those state values are valid. That therefore ensures that, within the learning phase, the necessary operations of predetermining parameters such as limit value range or good value range are implemented for each time series (test block) and each measurement channel.

In order to be able to intervene in the technical process prior to the occurrence of a failure, it can be provided that, in the monitoring phase, when a state value occurs in a time series with a predetermined time base which is outside the good value extent, a monitoring-related step is executed. Such a monitoring-related step can be implemented for example in the form of an automatically produced observation indication for the time series in question to the user, in particular also in the form of an electrical signal which is subjected to further processing.

As the implementation in respect of time of a time series can also already indicate a trend which relates to a state of a part integrated in the technical process such as of a machine or an installation, it can be provided in accordance with the invention that a parameter dependent on the implementation in respect of time of a time series, in particular a time derivative of the curve configuration of the time series, is ascertained, and a predetermined monitoring-related step is carried out in dependence on that parameter. In that case for example the first and/or the second time derivative can be taken into consideration.

In a particularly advantageous embodiment it can be provided that when the good value extent is exceeded by a state value within a time series of state values, subsequently the first and/or second derivative of the time series is ascertained and in dependence thereon the specific monitoring-related step is then selected.

In cases which are classified in particular as being critical it can also be provided for example that the technical process is stopped in order to avoid consequential damage caused by the failure of a part of the installation. If the need for urgency, by virtue of the detected information, is not so high, it may for example also be sufficient for a warning to be given to the user. In that respect the ascertained derivatives of the curve configuration can be compared to corresponding parameters which were ascertained in particular in the course of the learning phase or were predetermined in another fashion.

Particularly in situations in which the state base value for time series, in particular for all time series of a measurement channel, are determined independently of each other, it may be desirable for the situations which occur in the respective time series and which entail a monitoring-related step to be considered independently of each other. In that respect it can also be desirable that, in the monitoring phase, a state value of a time series, which is outside the good value extent, is not used for ascertaining a state value of the time series with a higher time base.

In the invention, after the occurrence of a state value outside the good value extent, leading to an oscillation between states in a permitted and a non-permitted range, it can be provided that, after the occurrence of that state value which is outside the good value extent in the time series, the subsequently ascertained state values of a time series are rejected as being invalid and are not incorporated into the time series until a state value is in a value range which is established solely by the state value voltage and the state base value of the time series. In relation to the above-described offset, this means that, after the occurrence of the poor value, the state value must fall or rise at least by that offset so that the subsequent state values are again incorporated as valid state values into the time series and are thus also used for ascertaining state values for the subsequent time series with a greater time base. In that respect the state value must fall by the offset value if the poor value lay above the good value extent and the state value must rise by the offset if the poor value lay below the good value extent. It is only thereafter that the state values are again classified as valid.

Particularly in situations in which the limit value range ascertained in the learning phase is so small that the good value extent ascertained therewith for the monitoring phase would frequently be exceeded without wear or the like having occurred, it can be provided that, for a time series, a minimum state range is predetermined, which replaces the limit value range ascertained in the learning phase, if the limit value range is smaller than the minimum state range.

In certain embodiments it may be desirable for measurement channels which detect physical parameters on machines or structural assemblies of machines to be bundled, referred to herein as reference groups, if the detected measurement parameters are subjected to the same operating conditions and external influences. Such reference groups of measurement parameters can be for example temperatures or pressures in cylinder heads of multi-cylinder internal combustion engines, exhaust gas temperatures of multi-cylinder engines, pressure or flow speeds of branched duct systems or also temperatures in heat exchangers.

As a further example of such a reference group, mention may be made of measurement channels with which the bearing temperatures of a drive shaft with multiple bearing assemblies are detected. The bearing loadings of the individual bearings are determined by the torque and the rotary speed which act in the same manner on all bearings. The range of fluctuations in the bearing temperatures are detected as described in the learning phase, thereby establishing a limit value range which is used in the monitoring phase for specifying a good value range. Particularly in the case of such temperature measurement operations, the external influences on the measurements can be in the region of fluctuations induced by operation. Such an external influence in the case of temperature measurement can be in particular the ambient temperature which is subjected to fluctuations according to the time of day and the time of year. Those fluctuations cannot be calculated and in general also cannot be detected in a learning phase as that would require a non-viable period of time. In that respect it may be desirable for the measurement data of a plurality of measurement channels within a reference group to be processed by means of predetermined rules to afford state values of coupled channels in order to minimise external influences on the measurement. Such coupled channels are referred to hereinafter as hybrid channels. The state values of such a hybrid channel can be time-compressed, like the state values of an individual measurement channel, in time series with difference time bases, in which respect those time bases like the time bases of an individual measurement channel can be used after the establishment of a limit value range in a learning phase for monitoring the technical procedure in the monitoring phase.

In order to compensate for such external influences as the ambient temperature on temperature measurement procedures, it can be provided that state values of a hybrid channel are formed by differencing of measurement data from physically correlated measurement channels. If for example the ambient temperature acts in the same manner on two temperature measurement channels, the influence of the ambient temperature on measurement can be compensated by forming the difference between the measurement data of the two channels. In that respect the invention makes it possible to detect even small temperature changes in a long-term comparison, even if those changes are much less than the superposed range of fluctuations in the ambient temperature as the influence of the ambient temperature in the hybrid channel is removed by calculation.

In addition it may also be desirable for state values of a hybrid channel to be formed by summing measurement data from measurement channels of a reference group so that it is also possible to detect therewith if the measurement values of the measurement channels of a reference group deteriorate uniformly, which cannot be detected in the variation in respect of time of a hybrid channel which is formed by forming the difference of measurement values from a plurality of measurement channels. When forming a hybrid channel by summing the measurement values of a plurality of measurement channels, in accordance with the invention, it is advantageous if the influence of the ambient temperature is taken into consideration by the ambient temperature being detected in an individual measurement channel and, multiplied by the number of the summed channels, deducted from the sum value of the hybrid channel.

It is particularly advantageous if both the stated hybrid channels are produced for the measurement channels of a reference group so that the number of the channels to be monitored, in spite of a large number of channels within a reference group, can be reduced to two, a difference channel and a sum channel. It should be pointed out that, with the described feature of forming a hybrid channel, besides the ambient temperature it is also possible to compensate for other general external influences which have an effect on the measurement values of the measurement channels of a reference group.

In terms of the apparatus, the invention attains the above-specified object by an expert system for monitoring technical processes comprising at least one measurement channel which has sensor, line and evaluation means for detecting measurement data, data processing means for processing the measurement data and for ascertaining a plurality of time series of state values with different time bases from the measurement data, and storage means for storing the time series of state data, wherein in a learning phase limit value ranges of the time series can be calculated and stored. In addition the expert system according to the invention includes a means for executing or triggering a monitoring-related step. That means can be for example an electric port at which a corresponding control signal can be outputted or also a display means for displaying that at least one state value of a time series has exceeded a predetermined limit (good value limit) in a monitoring phase. The expert system according to the invention is distinguished in that the data processing means in the monitoring phase for a time series calculates a good value extent with an upper and a lower limit value with the incorporation of a limit value range which is predetermined in the learning phase and a state base value of the time series, which is determined in the monitoring phase. In that respect it may be desirable if the state values are provided with a time mark so that the former can be precisely associated in respect of time.

In addition the invention also concerns a computer program product which is stored on a storage medium and which can be loaded into a memory of a computer and which includes software code portions with which one of the above-described methods according to the invention is carried out.

BRIEF DESCRIPTION OF THE SEVERAL VIEWS OF THE DRAWINGS

The invention is described hereinafter by way of a number of embodiments and further features according to the invention with reference to the accompanying Figures in which.

DETAILED DESCRIPTION OF THE INVENTION

Figure 1:
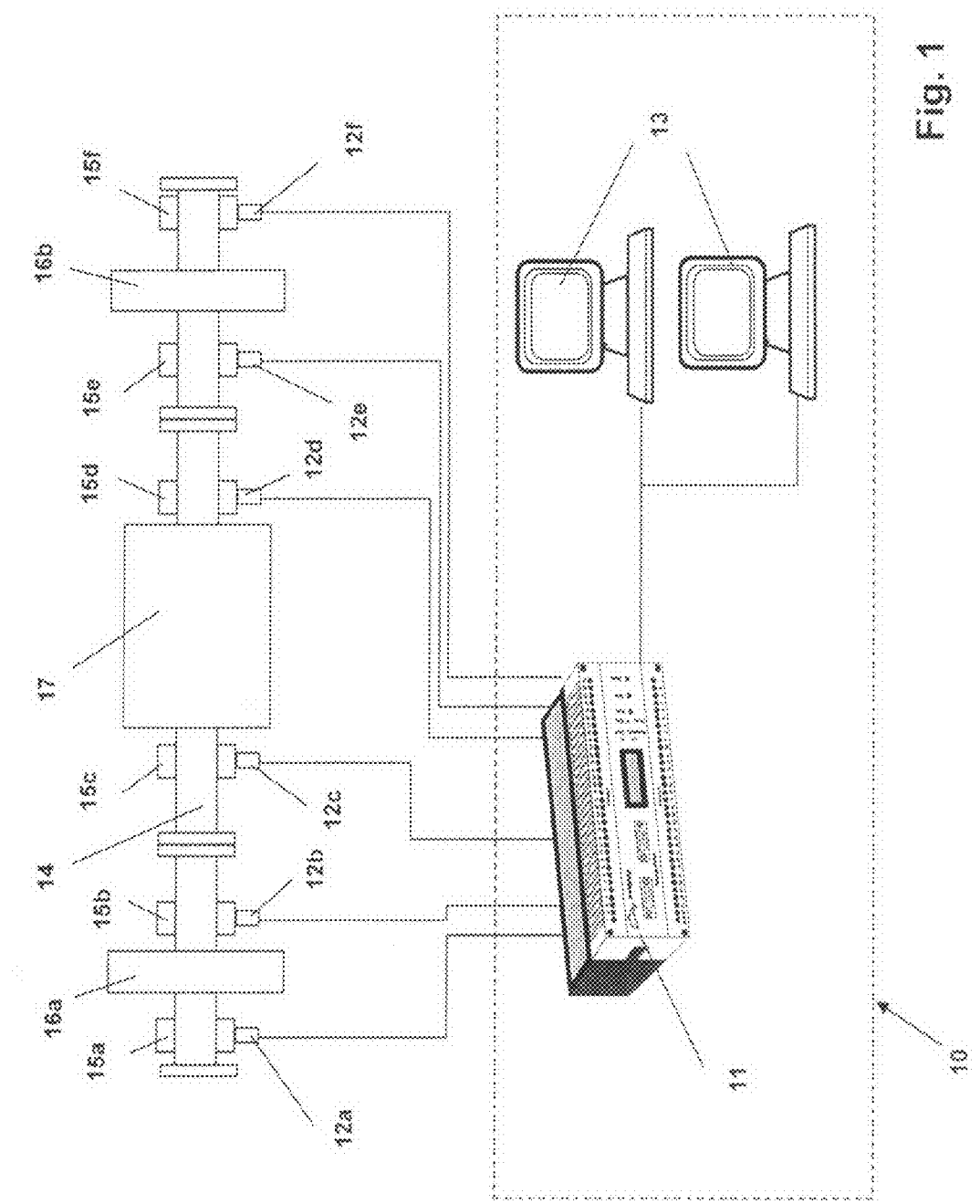
FIG. 1 shows a diagrammatic view of a technical process in the form of the operation of a drive shaft with six bearing assemblies, which is monitored in accordance with the invention.

FIG. 1 shows the operation of a drive shaft which is supported by six bearing assemblies, as a technical process which is monitored with the method according to the invention by means of the expert system 10. The expert system 10 includes a measurement unit 11 which is in data communication with PCs 13 for machine monitoring and process control. Suitable software runs on the PCs for that purpose. Data processing is effected depending on the respective embodiment involved directly in a CPU and/or in a special data processing module. The PCs further have analog and/or digital output ports (not shown) by way of which signals and items of information, in particular control signals, can be outputted. The measurement unit 11 has analog inputs to which a respective temperature sensor 12a through 12f is connected. They each measure the temperature in a respective bearing assembly 15a through 15f at which the drive shaft 14 is supported which by way of gears 16a, 16b drives one or more apparatuses (not shown). The shaft itself is set in motion by an electric motor 17.

Such a drive can serve for example to drive a pump by way of the specified gears 16a, 16b. Depending on the respective type of the measurement unit 11 which is provided as an interface between the temperature sensors 12a through 12f and the computers 13, it can perform various tasks. If for example the temperature sensors are in the form of thermoelements they supply voltage signals which in the measurement unit 11 are converted into digital measurement values in ° C. and are passed for data processing to the PCs 13. Those values are used by the computers for carrying out the method according to the invention, suitable software being installed thereon for that purpose.

The specified components form an expert system which can detect trends in the variation in temperature in respect of the detected state values and further other changes. It will be appreciated that the ascertained temperature values are not constant but alter with the speed of rotation of the shaft, the radial force and also with the ambient temperature. It is now essential to track minor changes which were or are not caused by external influences of that kind, but by loadings of the earlier or current condition of operation, and which reflect the state of the respective bearing assembly 15a through 15f.

Just minor changes in the temperature values of the individual bearing assemblies can provide indications for the service lives to be expected. Slight progressive changes in temperature point to a failure soon to occur. In the case of abrupt changes there is an immediately impending crash. Those changes are detected with the expert system according to the invention and warning indications are given in order to point to an impending failure or also to establish optimum times for maintenance operation with computer aid and automatically. By way of example a corresponding indication can be provided for the user on the monitor of the PC 13 or any desired control signals can be outputted by way of an output (not shown). In addition trend graphs for the time series of the measurement channels can be outputted on the monitors of the PCs 13.

Figure 2:
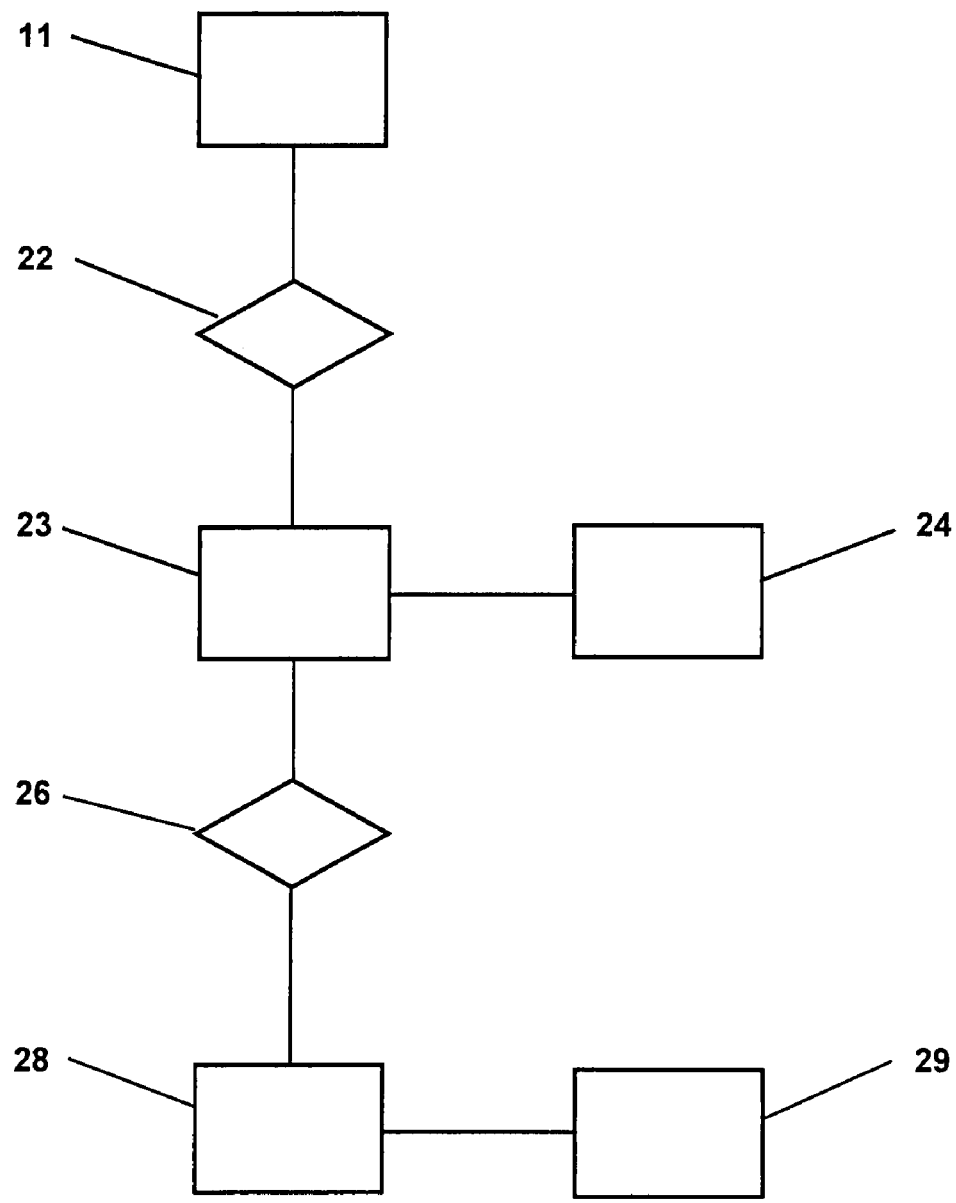
FIG. 2 shows a diagrammatic flow chart to illustrate monitoring according to the invention of the technical process shown in FIG. 1.

FIG. 2 shows a flow chart to illustrate the method according to the invention of monitoring the operation of the drive shaft shown in FIG. 1. It will be appreciated that the invention is not restricted to technical processes with temperature measurements. By way of example variations in pressure in relation to pumps and compressors or also quantitative flow rates of liquid or gaseous media can be detected. All available measurement data which reflect the influence of wear, fouling, corrosion and so forth can be incorporated into the system so that the user acquires an overall image of the state of the machine. Thus the state of the machine or the installation can be accurately ascertained so that the optimum times for maintenance operations can be established and in addition the threat of failure of the installation can be predicted at an early time and the necessary countermeasures can be taken. The state temperature values of the bearing assemblies 15a through 15f, which are detected by the measurement unit 11, are here combined in a reference group as the various temperature sensors ascertain mutually dependent correlated states so that joint processing of those state values can supply further items of information, for example whether a bearing assembly is behaving differently from the others. That grouping of measurement data in respect of various, mutually correlated measurement channels can supply essential items of information for monitoring of the technical process. In that respect it can be highly advantageous for the grouped measurement data to be processed jointly. That will be discussed in greater detail hereinafter.

It will firstly be assumed hereinafter for the sake of simplicity of the illustration that the measurement data from the six measurement channels are processed independently of each other. FIG. 2 shows the processing of the measurement data of an individual measurement channel, that is to say an individual temperature sensor in FIG. 1. The temperature values which are digitally delivered by the measurement unit 11 are examined in respect of their validity in the module 20. If a predetermined validity condition is not satisfied the data are rejected. The data are classified as valid only if the technical process is in a quasi-static, that is to say steady-state, operating phase. For the present case that means that the drive shaft has started and at least a predetermined operating temperature has been reached. In the described example, a minimum rotary speed of the shaft, in conjunction with a start-up time, can be provided as criteria in terms of the validity of the measurement data. It is only after the start-up time has expired and only when the rotary speed of the drive shaft has exceeded the predetermined minimum value that the temperature values can be used for further processing as the validity condition for the measurement values is reached. The measurement values are enabled for further processing by the validity module 20 when that condition applies.

Now, the incoming data are time-compressed in the module 22 into test blocks involving different time bases, and stored in the module 23. In that respect, given parameters are firstly ascertained in a learning phase, then being predetermined in the following monitoring phase and being fixed. Such a value which is established in the learning phase is in particular the limit value range in respect of the state values of a test block which specifies the range, that is to say the extent of the fluctuation in the state values which are classified as good values by the expert system.

That value range is determined by the limit value range and the state base value in respect of the respective time series, which in the embodiment described here is determined by averaging of the maximum value stored in the time series and the minimum value stored in the time series. In another embodiment that state base value can also be formed by averaging of all state values involved in the time series.

In the example given here the temperature sensors each supply an individual measurement value per second. Those values for the test block with the smallest time interval are used directly. Statistical compression of the measurement data is effected by way of producing state values in time series, in which respect those state values can be for example minutes, hours, days, weeks, months or years values, in dependence on the respective time series. Thus for example it is possible to produce data sets for minutes, hours, days, weeks, months or years values of the measurement data. By way of example a state value in the test block with the next higher time base, that is to say the test block with state minutes values, can be calculated by averaging a predetermined number of measurement values. A state value in the test block with the next higher time base, that is to say in the test block with state hours values, is in turn calculated by averaging of a predetermined number of state values in the test block of the minutes state values, and so forth.

After those time series (test blocks) with different time bases have been established in the module 22 and after storage in the module 23 the time series produced are outputted in such a way that they can be called up by a user, in the module 24, as a trend output, on a screen, and represented thereon. That means that the user enjoys the possible option of visually detecting trends in respect of the detected data sets. The detected data can be tracked back over long periods of time and represented in graph form. The trend output module 24 supplies the trends of the measurement channels irrespective of whether changes have occurred.

In the following evaluation module 26 the statistical values of the time series are automatically examined for changes. In that case the procedure involves detecting whether predetermined trend value limits were exceeded or how the configuration of the one or more time series has altered over time. For example, the procedure involves detecting whether that change is linear in relation to time or presents a progressive characteristic. In response to the result of the evaluation module 26, the monitoring-related steps are initiated in the module 28 insofar as that has been found to be necessary in the module 26. By way of example a measurement channel can be incorporated into an observation or also into a warning list, and the user can be notified thereof. If a critical situation is detected it is also possible for the procedure to give an alarm or a control signal with which for example the technical process, here operation of the drive shaft 7, can be the subject of an emergency shut-down.

For documentation of the implementation of the technical process, it is provided that the signals and messages outputted by the evaluation module 26 are stored in a database 29 in a memory of the expert system.

Figure 3:
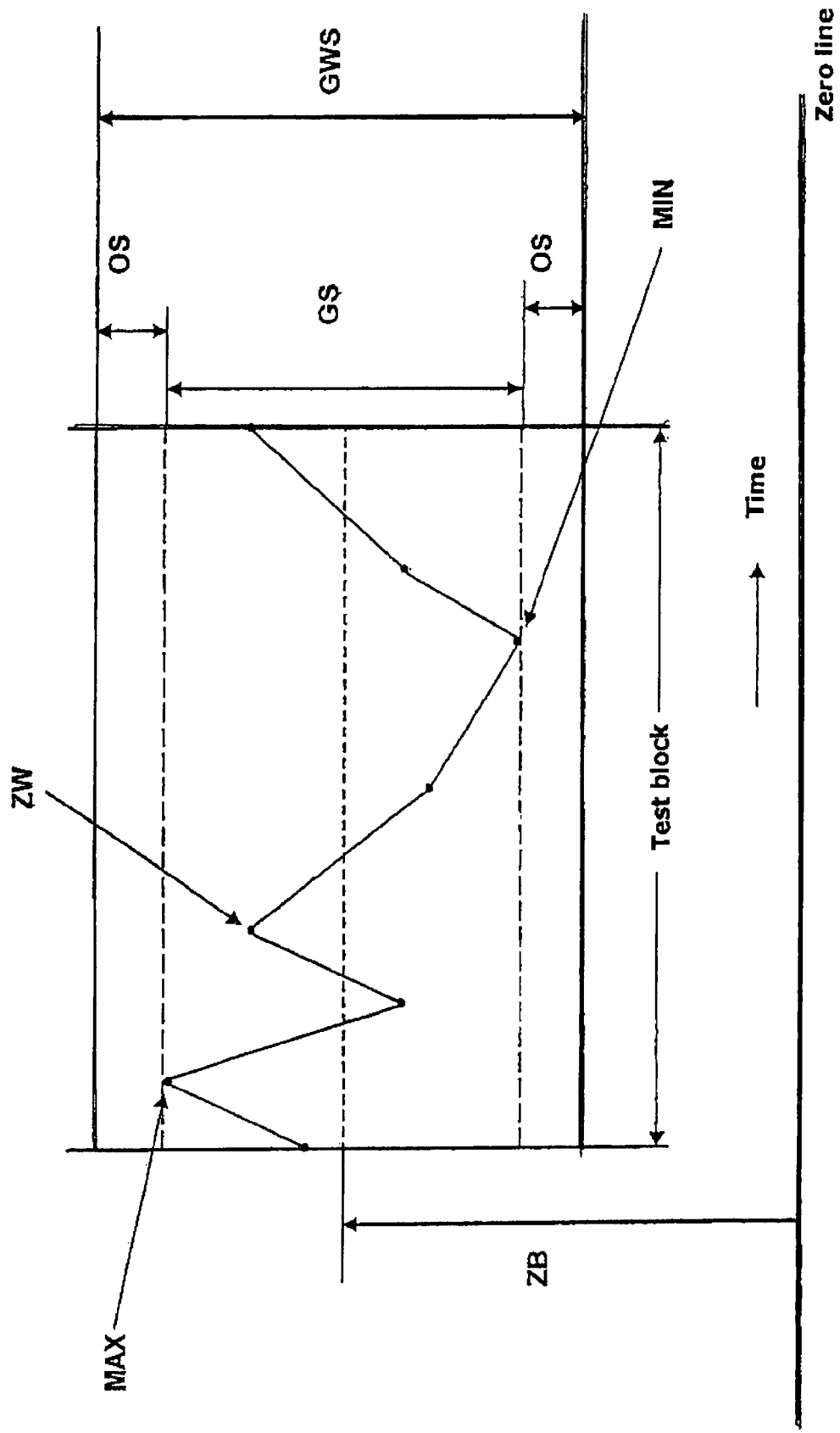
FIG. 3 shows a trend graph of state values of one of the sensors shown in FIG. 1.

Reference will now be made to FIG. 3 hereinafter to describe the production of a test block for the state values of a predetermined time base, as is implemented in the module 22, see FIG. 2. In that respect firstly the time base with the shortest time interval is considered, that is to say the first time series which in the described embodiment is composed of 60 individual values, detected at a seconds rate, of the temperature values provided by the measurement unit, from one of the temperature sensors, see FIG. 1. The values which have reached the module 22 have passed through the validity module 20 and have been identified as valid as the state of the technical process was detected as being quasi-static. Both in the learning phase and also in the monitoring phase measurement values which were not recognised as valid measurement values are not used in this embodiment for further evaluation.

Prior to the start of the monitoring phase, in the learning phase the respective limit value range which is fixedly predetermined in the subsequent monitoring phase is ascertained for each time series of state values. In the first time series, that is to say the time series with the shortest time interval, the temperature measurement values of a sensor represent the state values of the time series as the measurement values are not compressed. The test block length of the minutes test block can be set in minutes steps by the user. If the test block is preselected for example for receiving 60 measurement values, it takes precisely 1 minute until the test block is filled with the state values as they are provided at a rate of 1/sec.

In the described embodiment the limit value range of the respective time series is ascertained by the difference between the maximum value and the minimum value within the time series in the learning phase. The limit value range for the first test block is accordingly afforded by subtraction of the minimum value from the maximum value within the minutes test block. As the test block includes the maximum number of 60 values here, with each fresh value the state value which is oldest in terms of time is removed from the test block. In that respect the test blocks are implemented in a sliding mode. Insofar as the maximum value or the minimum value is removed from the series, a new limit value range can accordingly then be produced in the learning phase, which specifies a fresh ambit of fluctuation in respect of the state series.

In the described example the second time series is an hours time series which receives compressed state values of the minutes time series, with compression of the state values being implemented by way of averaging. Each state value in the hours time series is ascertained by averaging of 60 state values of the minutes time series. As in the case of all test blocks, the test block length of the hours test block can also be preselected on the part of the user.

Each state value in the days time series is ascertained by averaging of 24 state values of the hours time series. Each state value in the weeks time series is ascertained by averaging of 7 state values of the days time series.

Each state value in the years time series is ascertained by averaging of 52 state values of the weeks time series.

Particularly in the case of intermittent operation of the machine/installation to be monitored or when moving to a fresh working point such as a fresh rotary speed of a motor, it can happen that no valid measurement values can be ascertained for a certain period of time as the machine/installation is not in a steady-state condition. That operating phase which occurs in the monitoring phase and which is not a steady-state situation can be recognised as dynamic by the expert system and in that respect the measurement values are rejected as invalid. In order to avoid that no state values can be ascertained in such situations even in time series with higher time bases even with a few invalid measurement values, respective minimum numbers of state values are predetermined for the time series, which must be present so that time compression of the values can be implemented for ascertaining a state value for the next higher time series. The described embodiment provides that compression is effected if at least 33% of the state values are present within a time series. If for example in the hours time series whose time interval in the described embodiment is 60 minutes, that is to say includes 60 values, only 25 values can be ascertained within 60 minutes, then nonetheless a compressed state value is calculated for the next higher time series, here the days time series, with the detected state values, as the number of the values ascertained is above the predetermined limit of 20 values. Otherwise a dummy value is incorporated into the next higher time series. In another embodiment that minimum number of state values is not fixed as being the same for all time series, but can be different depending on the respective time base involved.

It should be pointed out that the duration of the individual time series can be set manually and the above-described time ranges in respect of the time series as well as the number of time series in the example specified are given only by way of illustration. Such a time series which is set to a fixed time range is referred to as a test block, as already indicated.

A respective limit value range is ascertained in the learning phase for the time series, in the manner described. In that respect the limit value ranges for time series with a very great time range, for example a months or years time series, can also be inputted manually as otherwise the learning phase would last for a disproportionately long time. In the learning phase all state values are incorporated into the respective time series, independently of the value, insofar as those state values go back to valid measurement values. That also provides for using all state values for compressing of the state values, for ascertaining a state value for the next time series.

If the limit value ranges for the time series are predetermined manually or ascertained, as described, it is possible to switch into a monitoring mode in which those time value ranges (ranges of fluctuation) are fixedly predetermined. In the described embodiment a good value range is established by the addition of an offset range to the limit value range ascertained in the learning phase. That offset range can be manually preset and is kept constant like the limit value range in the described embodiment during the monitoring phase. In another embodiment the good value range includes only the limit value range, that is to say the offset range is identical to zero.

The transfer of measurement or state values into the next higher time series is identical to the procedure in the learning phase. If however a state value is outside the good value range, then in this embodiment the state value is not taken into account in the monitoring phase for ascertaining the state values of the higher time series. In addition, in the time series in question, a monitoring-related step is triggered, as will be discussed in greater detail hereinafter.

In each test block the measurement values or state values of the individual channels have a maximum permissible gradient in respect of time. The content of the test blocks is represented in test block graphs which are referred to as trend graphs. In the small time ranges such as minutes and hours the state values are changed due to different influences, for example fluctuations in the power supply or the ambient temperature. By virtue of the kind of representation, the trend graphs increasingly approach a horizontal straight line, with a greater time range, in the good state. An inclination away from that horizontal can then indicate a change in state of the machine/installation, which under some circumstances requires maintenance operations. The essential task of data processing in the various test blocks is to establish the gradients of the respective time series and compare them to the permissible gradients ascertained in the learning phase. In that respect it is to be noted that the limit value ranges ascertained in the learning phase directly correspond to a gradient of the time series as the time range of each time series is predetermined.

FIG. 3 shows the described situation in a test block by way of example, with eight state values ZW. The good value range GWS is established by the limit value range GS and double the offset range OS. The good value extent is established by the good value range GWS and a state base value ZB. That state base value ZB is ascertained both in the learning phase and also in the monitoring phase in the described embodiment of the expert system according to the invention by averaging of the currently prevailing maximum value MAX and the minimum value MIN in the respective time series. In that respect the state base value changes continuously during the monitoring procedure so that monitoring can be better adapted to external influences on the technical process to be monitored. It is only when a state value is outside the good value extent that an alarm is triggered. In the illustrated embodiment the upper limit of the good value extent is $$OG = ZB + \frac{GS + OF}{2}$$

while the lower limit of the good value extent is calculated as $$UG = ZB - \frac{GS + OF}{2}.$$

In the described embodiment a minimum range is predetermined for each time series. If the limit value range ascertained in the learning phase is less than the minimum range the former is replaced in the monitoring phase by the minimum range.

In order to process the data from a plurality of correlated measurement channels simultaneously and to represent them in a common graph, it is provided that the time series of the measurement channels are respectively standardised for a time base. The state standard values ZN in that case are calculated as:

$$ZN = \left(\frac{(ZW - ZB)}{GS * 0.5}\right),$$

wherein once again ZW is the state value, ZB is the state base value and GS is the limit value range. The limit value extent of a time series is thus between ±1 in the standardised representation. The good value extent of a time series in the standardised representation with an offset by way of example of 10% of the limit value range is between ±1.1. Such standardising data preparation is useful in particular when monitoring a reference group if data of different measurement channels are to be correlated together. By way of example the six temperature sensors shown in FIG. 1 are highly suitable for establishing such a reference group as in that way it is possible to directly detect when for example one measurement channel is behaving differently from the others.

In the described embodiment the expert system according to the invention in the monitoring phase triggers an alarm if a state value in a test block exceeds the good value extent. In that respect an alarm is triggered only when a limit line of the good value extent is crossed from the inside outwardly. In order to trigger off a fresh alarm, the state value must firstly fall after an alarm into the limit value extent again, that is to say it must fall or rise at least by the preset offset, depending on whether the value moved outside the good value extent upwardly or downwardly respectively.

As soon as the good value extent has been left, the expert system in the described embodiment automatically ascertains the second time derivative of the time series in question. That derivative is compared to predetermined values and in response to the comparison causes observation of the time series or a warning is delivered to the user.

Furthermore it is also in accordance with the invention to ascertain from the measurement data of various measurement channels of a reference group, state values of at least one hybrid channel, the configuration in respect of time of which is again monitored automatically by the expert system according to the invention to provide for state-oriented maintenance of a machine/installation. The state values of such a hybrid channel, like the state values of an individual channel, can be time-compressed as described hereinbefore in time series with different time bases.

The use of such hybrid channels will be described hereinafter with reference to the operation of a heating boiler, in which respect the changes in the transfer of heat at the heat exchanger of the boiler are to be monitored. In the specified example the heating boiler is operated with oil, wherein the combustion energy of the oil is delivered to a heat exchanger which includes a water circuit. The transfer of heat is crucial in terms of the level of efficiency of the heating boiler, in wherein changes can be caused in particular by deposits and corrosion. Provided at the heat exchanger are six temperature measurements $T_1$-$T_6$ which are combined together in a reference group. The measurement locations detect the temperature patterns between the entry and the exit of the water circuit, wherein the ambient temperature $T_{ambient}$ is detected at a further measurement location. The temperature sensor for ambient temperature is in that case placed in such a way that it remains unaffected by the heat radiation of the heating boiler. The measured temperature value $T_{measurement}$ at one of the measurement locations is in that respect composed of the temperature governed by operation, namely $T_{operation}$, and the ambient temperature $T_{ambient}$:

$$T_{measurement} = T_{operation} + T_{ambient}.$$

The state values of a first hybrid channel are now produced by differencing of the measurement data of two respective measurement channels:

$$T_{diff} = \sum_{i=1}^{i=2n}(T_{2i-1} - T_{2i}) \text{ wherein } n = 1, 2, 3 \ldots$$

wherein $T_{diff}$ is an individual state value of the difference channel, i is the respective measurement channel and $T_i$ is an individual measurement value of that measurement channel. In general terms the measurement data $T_i$ of the various measurement channels i are recorded at the same moment in time so that the respective calculated state value $T_{diff}$ of the hybrid channel is also associated with that moment in time. In the specified example with six temperature measurement locations on the heating boiler n=3 so that the state values of the difference channel are:

$$T_{diff} = (T_1 - T_2) + (T_3 - T_4) + (T_5 - T_6).$$

As explained the magnitude $T_{ambient}$ drops out in the operation of forming the difference in respect of the measurement data of the measurement channels within the reference group so that the state values of the difference channel are independent of the ambient temperature.

As the procedure does not recognise if the state parameters $T_1$ and $T_2$ or $T_3$ and $T_4$ or $T_5$ and $T_6$ change simultaneously in the course of time of the difference channel, it further provides for the formation of a sum channel in which the measurement data of the individual six temperature locations are added and subtracted from the sum of six times the measurement value of the temperature sensor which detects the ambient temperature:

$$T_{sum} = T_1 + T_2 + T_3 + T_4 + T_5 + T_6 - 6*T_{ambient}.$$

In general terms that can be expressed for any number of measurement channels within a reference group by:

$$T_{sum} = \left[\sum_{i=1}^{i=2n} T_i\right] - (2n)*T_{ambient}, \text{ wherein } n = 1, 2, 3 \ldots$$

and n is once again a natural number.

The state values $T_{diff}$ and $T_{sum}$ are time-compressed by the expert system according to the invention, as described hereinbefore for an individual measurement channel, in time series with difference time bases. In the learning phase a limit value range is also determined for each of the hybrid channels in the same fashion as in the case of an individual measurement channel and in the monitoring phase a good value extent of the state values is calculated for a time series with an upper and a lower limit, with incorporation of the limit value range which is predetermined in the learning phase and the state base value of the time series, which is determined in the monitoring phase. The time series of a hybrid channel can be used in the same way as the time series of an individual measurement channel for the method according to the invention, for monitoring technical processes in machines/installations.

Figure 4:
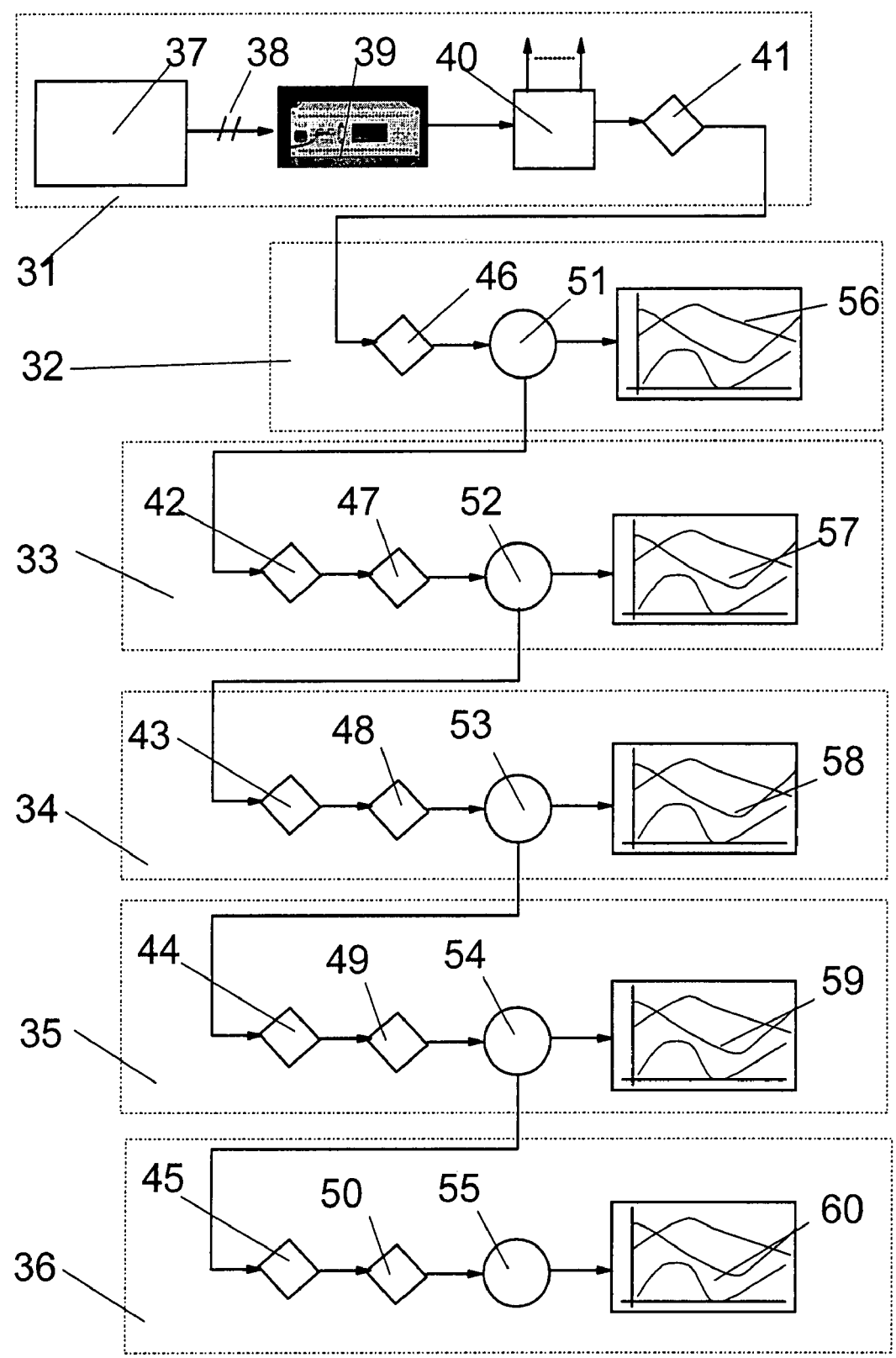
FIG. 4 shows an expert system according to the invention for monitoring a technical process for describing the data flow.

Reference is made to FIGS. 4-7 to describe hereinafter a further embodiment of an expert system according to the invention. Unless stated to the contrary this system operates like the system described with reference to FIGS. 1-3 or is of an identical structure thereto. FIG. 4 shows an expert system in accordance with the invention, on the basis of which the data flow when implementing a method according to the invention of monitoring a machine 37 is described hereinafter. In this respect the machine 37 can be for example a turbine on which sensors are mounted, for detecting process data such as temperatures, pressures, through-flows and so forth as well as vibration data.

Those sensors on the machine 37 are connected by way of lines 38 to a measurement data detection apparatus 39. A sensor whose respective line 38 as well as the associated input of the measurement data detection apparatus 39 are referred to herein as a measurement channel. The essential task of the measurement data detection apparatus is to convert the measurement values detected by the sensors into a digital data stream which is compatible with the data network used, for example an Ethernet. In addition at least for some measurement channels the measurement data detection system combines measurement values which involve a high level of resolution in respect of time by averaging so that for example measurement values which are averaged in that way can be delivered by the measurement data detection apparatus for given measurement channels at seconds spacings. At the output side the measurement data detection apparatus 39 is connected to a measurement data-processing unit 40 which allocates the measurement channels to reference groups. In the data flow chart that is followed by the validity test group 41 which differentiates the measurement values in the various measurement channels in accordance with valid and invalid measurement values. The validity test group is followed in succession by the unit 32 of the minutes test block, the unit 33 of the hours test block, the unit 34 of the days test block, the unit 35 of the weeks test block and the unit 36 of the years test block. Each of those units 32-36 has a functional unit 46-50 for ascertaining the respective limit range/good value extent for the respective time series, a test block storage means 51-55 and graphic output means 56-60 for representing the state values in the respective time series (test blocks). The units 33 of the hours test block, 34 of the days test block, 35 of the weeks test block and 36 of the years test block also each have a respective functional unit for ascertaining the mean value of state values. In the described example the unit 32 of the minutes test block does not have an average value-forming member of that kind as the measurement value-processing unit 40 outputs the measurement values for each measurement channel at the seconds rate and in that respect no averaging is necessary for the state values of the minutes test block as the state values in the minutes test block 32 consist of measurement values which are ascertained at the seconds rate. All units 40, 32-36 can be implemented in a processor-controlled hardware which is independent of PCs, but it is also in accordance with the invention for the units to be afforded by the execution of a program on one or more PCs which has the required input/output ports.

As already discussed the measurement data of the various sensors on the machine 37 are allocated to different reference groups in the unit 40. By way of example the vibration identification data of bearing assemblies of a shaft which is supported by four bearing assemblies can be allocated to an individual reference group and various exhaust gas temperatures can be allocated to a further reference group. Those reference groups, their respective identification and the allocation of the measurement channels to the reference groups can be established by the user by way of system configuration.

Looking at FIG. 4 the data output of the measurement data-processing unit 40 is connected to the data input of the validity testing unit 41. That data connection represents the data of an individual reference group, that is to say the data of the measurement channels associated with that reference group. The data paths of the other reference groups are represented by the vertical arrows at the output side of the unit 40 and do not have to be further described as the data flow is identical to that of the individual reference group which is described hereinafter and which is represented by the horizontal data flow arrow at the output side of the unit 40.

The validity test unit 41 checks whether the measurement values in the measurement channels of the reference group comply with predetermined validity conditions. In that respect a plurality of validity conditions can be formulated. By way of example it is possible to specify that the measurement data are valid when the rotary speed of the machine 37 is greater than 1500 rpm. In the described example that validity condition ensures that the machine 37 is in a quasi-static state, that is to say that the machine has reached its operating temperature and thus its working point. In the validity test unit 41, associated with each measurement value is a validity flag which is set to 1 when the measurement value is valid and to 0 when the measurement value is invalid. Only valid measurement values can trigger monitoring-related steps.

The measurement values, which are respectively extended with the described validity flag, of the measurement channels of the reference group being considered here are now passed to the test block unit 42 and there go to the input of the functional unit 46 which ascertains the respective limit value range or the respective good value extent of the various time series (test blocks) for the respective minutes test block. That unit 46 involves different functions like the units 47-50 which perform the same function, during the learning phase and the monitoring phase. During the learning phase the value of the limit value ranges is ascertained from the difference between the largest and smallest measurement values within the test block. In contrast, during the monitoring phase, in said units 46-50 the state values of the time series are checked to ascertain whether they exceed a limit line, which triggers off an alarm. As described hereinbefore in relation to the first embodiment that limit line is calculated on the basis of the respective limit value range ascertained in the learning phase.

During the learning phase, at each valid or invalid measurement value of a measurement series, which occurs at the input of the unit 46, the oldest measurement value is removed from the test block and the new measurement value is introduced into the test block as the newest measurement value in time, and fed to the test block storage means 51. The same applies in the monitoring phase.

During the monitoring phase the unit 46 checks whether the respective measurement value is within or outside the good value extent. In that case, yet another flag, the so-called good value flag, is added to each measurement value beside the validity flag which has just been described above, that further flag indicating whether the respective measurement value is within or outside the good value extent, during the monitoring phase. If the measurement value is in the good value extent, that flag is of the value 1 in the described embodiment. In that respect, as described hereinbefore for the first embodiment of the invention, the good value extent is also calculated having regard to a predetermined offset.

If the respective measurement value is outside the good value extent, that is to say the upper limit line of the good value extent is exceeded or if the value falls below the lower limit line of the good value extent, see also FIG. 3, the good value flag is of the value 0.

In the described embodiment a measurement value is transferred together with a validity flag and a good value flag, which in combination represent a data packet in the data flow.

Referring once again to the function of the unit 46 during the monitoring phase, after the detection of a good value flag of 0, the procedure involves checking whether the good value flag of the preceding measurement value is 1 or 0. If the good value flag of the preceding measurement value is of the value 1, then, with the following measurement value, one of the limit lines of the good value extent is exceeded for the first time in an outward direction, thereby giving rise to the condition of an alarm. Such an alarm can either trigger off the action of observation or the action of a warning. An observation action is triggered if the preceding measurement values of the time series are on a straight line. A warning action is triggered if the tendency of the valid measurement values in the test block is non-linear and not degressive but progressive.

If the good value flag of a measurement value is of the value 0 then the validity flag of that value, in the next higher time series, that is to say for the unit 33 of the hours test block, is set to 0, that is to say that measurement value is identified as being invalid. That ensures that an alarm is triggered only in an individual time series by the measurement value outside the good value extent, and not also in the subsequent time series with higher time bases. In this embodiment therefore state values outside the good value extent are classified into the next higher time series or compressed, in which case however the procedure involves ensuring by means of the validity flag that those state values do not trigger an alarm in the higher time series.

As soon as a good value flag for a state value or a measurement value in a time series is of the value 0, then in the described embodiment the good value range is lowered in the time series in question by the value 2×offset. This means that then both the upper good value limit and also the lower good value limit are established solely by the limit value range established in the learning phase and the state base value of the respective time series, see FIG. 3. The subsequent measurement values or state values become valid again only when they return to the range fixed by the limit value range. That reduction of the good value range GWS to the limit value range DS prevents 'flutter' in monitoring when the measurement values or state values move in the region of the limit lines of the good value range GWS.

The following combinations can occur in terms of the association of the validity flag and the good value flag for a measurement value or a state value:

| Validity flag | Good value flag | Measurement value |
|---|---|---|
| 1 | 1 | valid measurement value within the good value extent |
| 0 | 1 | invalid measurement value within the good value extent |
| 1 | 0 | valid measurement value outside the good value extent |
| 0 | 0 | invalid measurement value outside the good value extent |

The measurement values are fed to the test block storage means 51 of the minutes test block from the unit 46 in accordance with the foregoing Table either as valid or as invalid seconds measurement values. The test block length of the individual time series in the storage means 51-55 can be established within certain limits on the part of the user in the described embodiment. By way of example the minutes test block can be set to a time length of 20 minutes, it then embraces 1200 seconds measurement values.

During the monitoring phase in the feed of a fresh measurement value into the minutes test block a plurality of method steps are carried out. Firstly the oldest measurement value is removed from the test block and the fresh measurement value is put into the test block. If the measurement value is valid the procedure involves checking whether the newly introduced measurement value is within or outside the good value extent.

If a valid measurement value is within the good value extent the currently prevailing maximum measurement value (Max) and the currently prevailing minimum measurement value (Min) of the test block is ascertained and the fresh base value is calculated therefrom by averaging. The new valid measurement value and the calculated base value are then passed to the test block storage means 51.

If however a valid measurement value is outside the good value extent, in which case the good value flag of the preceding measurement value was 1, that signifies that the fresh measurement value has passed in an outward direction across the good value boundary lines. The system triggers off an alarm and sets the good value flag of the measurement value in question to 0. At the same time the good value range GWS is reduced to the limit value range GS, that is to say the offset OS is set with a time limitation to 0, see FIG. 3. The fresh measurement value is also passed to the test block storage means 51.

If however the valid measurement value is outside the good value extent, wherein the good value flag of the preceding measurement value was 0, that means that the fresh measurement value is still outside the newly established good value extent. The fresh measurement value is passed to the test block storage means 51.

If in contrast it is found that a fresh measurement value has passed from the outside inwardly across one of the two limit lines, that is to say either the lower or the upper limit line of the limit value extent, it is established that the measurement value has returned to the good value extent. In that case the good value flag is set to 1 and the Max value and the Min value of the test block is ascertained and the fresh base value is thereupon calculated as described. At the same time the good value range is again reduced to the limit value range by the addition of double the offset. The fresh measurement value and the calculated base value are fed to the test block storage means 51.

As illustrated in FIG. 4 the time series (test blocks) in a reference group are represented in graph form by way of a display device 56 connected to the test block storage means 51. Various representation modes can be selected on the part of the user, for example that shown in FIG. 3 or also one which is referred to as a standard value graph means, in which various measurement channels involving standardised amplitudes are shown, so that the measurement values of all measurement channels of the reference group can be compared to each other as their measurement ranges are standardised to ±1.

For passing the measurement values to the next higher time series the test block storage means 51 is connected to the average value-forming device 42 of the hours test block 33. In the functional unit 42 the seconds measurement values in the test block 51 are converted into minutes values by average value formation. For that purpose the last 60 seconds values of the test block storage means 51 are fed to the average value-forming device 42 at respective intervals of 1 minute, and the procedure checks how great the proportion of valid measurement values is. If that proportion of valid seconds measurement values exceeds an adjustable limit value such as for example 20%, a valid minutes average value is calculated by averaging from the valid seconds measurement values and the validity flag of the minutes average value is set to the value 1. If however the number of valid measurement values is below the limit value of 20% specified by way of example, the average value of all seconds values is formed and the validity flag of the freshly calculated minutes value is set to 0, that is to say the ascertained minutes value is invalid. The minutes average values ascertained as described are transmitted together with the validity flag to the unit 47.

As shown in FIG. 4 for that purpose the output of the average value-forming device 42 is connected to the input of the unit 47. There, similarly to the procedure which has been described hereinbefore for the unit 46, a check is made to ascertain whether the respective minutes state value is within or outside the good value extent. Depending on the respective result of the checking operation the good value flag is set to 0 or 1 and the valid or invalid minutes average value is stored in the test block storage means 52. That storage means is also connected to a display device 57 which operates similarly to the device 56 and which itself shows one or more hours time series in the test block of the reference group.

The functional groups for the days test block 34, the weeks test block 35 and the years test block 36 operate similarly to the operation described with respect to the hours test block, in which case however operation is implemented with different time bases as seconds measurement values are stored in the minutes test block, minutes measurement values are stored in the hours test block, hours measurement values are stored in the days test block, days measurement values are stored in the weeks test block and weeks measurement values are stored in the years test block. A further difference can lie in the test block lengths. As already stated the test block lengths of the individual test blocks can be established in user-specific fashion in the various time bases. By way of example the minutes test block can be set to 20 minutes, the hours test block to 24 hours, the days test block to 40 days, the weeks test block to 53 weeks and the years test block to 10 years.

Figure 5:
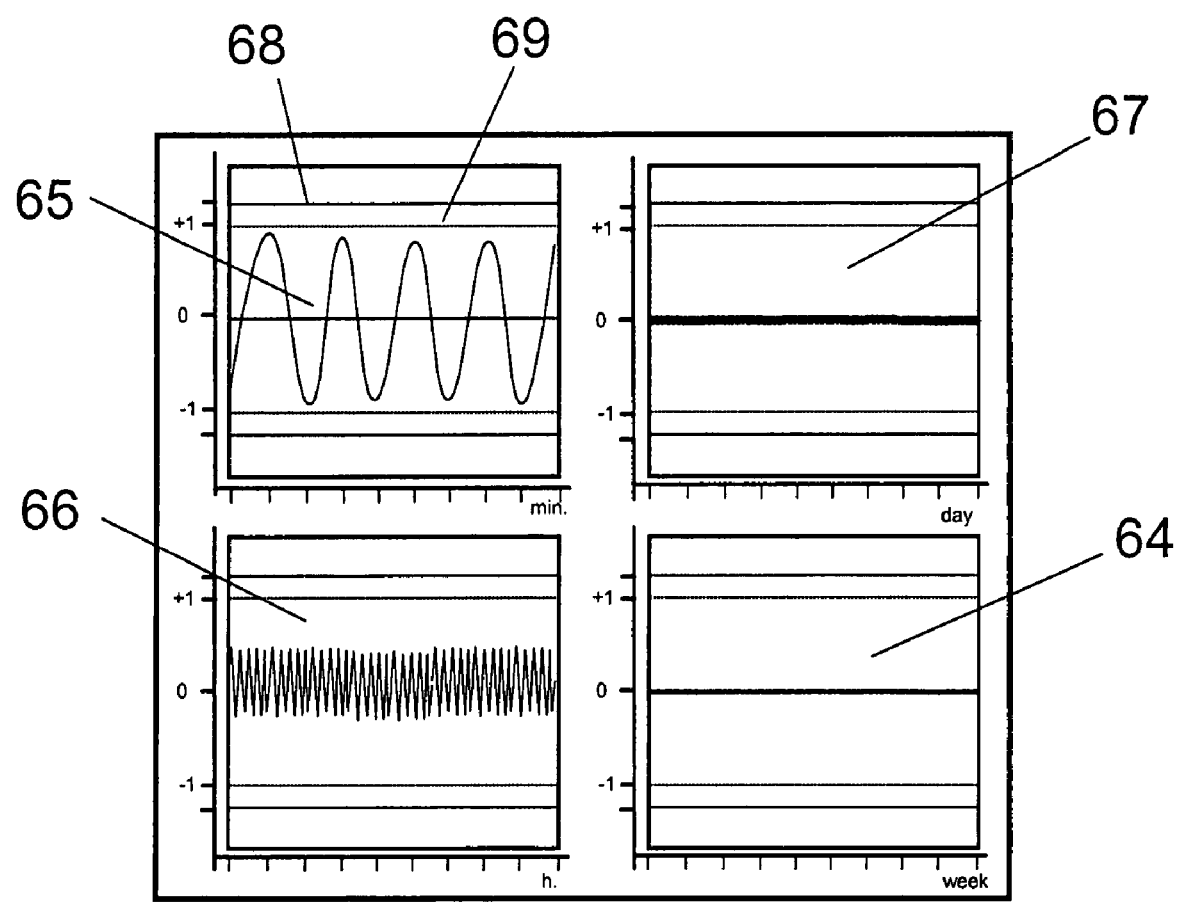
FIG. 5 shows a view of a minutes, an hours and a days time series for a measurement channel.

FIG. 5 shows a display screen representation in which four graphs of test blocks of different time bases are shown. A minutes graph 65, an hours graph 66, a days graph 67 and a weeks graph 64 which represent the respective minutes test block, hours test block, days test block and weeks test block of the same measurement channel, are to be seen here. In the minutes graph 65 the upper boundary line of the good value extent is identified by reference 68 and the upper boundary line of the limit value extent is identified by reference 69. In the example shown in FIG. 5 the minutes graph 65 shows valid seconds values of a measurement channel. The values fluctuate in a given range in such a way that they do not touch the boundary lines of the limit value extent. As stated the hours graph 66 shows the same measurement channel, but in this case the state values have a much smaller fluctuation than the seconds values by virtue of the averaging of a predetermined number of seconds values. The days graph 67 once again also shows the same measurement channel, in which case the curve has made a transition into a substantially wide horizontal line, by virtue of averaging once again. In the weeks graph 64 the width of the horizontal line is further reduced, in comparison with the days graph.

In the described embodiment the gradient of the curve in the respective time series is a determining aspect in regard to establishing the monitoring-related step which is triggered when predetermined limit values are exceeded during the monitoring of the technical process. If the valid measurement values of a measurement channel are represented in the long-time range (weeks test block or days test block) as horizontal lines, there is no departure from the good value extent and thus also no alarm is triggered. In that case the system according to the invention assumes that no maintenance measures are required as no alterations have occurred in terms of the state of the installation or machine. It is only when the long-time curves present a gradient which is not equal to 0 that changes in the state of the underlying processes can be diagnosed. If the measurement values change in an average time value such as within a week, the fact of traversing the boundary lines of the good value extent generally indicates an impending crash. If however the measurement or state values depart from the good value extent in the short-time range (seconds, hours), the system assumes there is a fault or disturbance such as for example a leak or a breakage and triggers a corresponding alarm.

Figure 6:
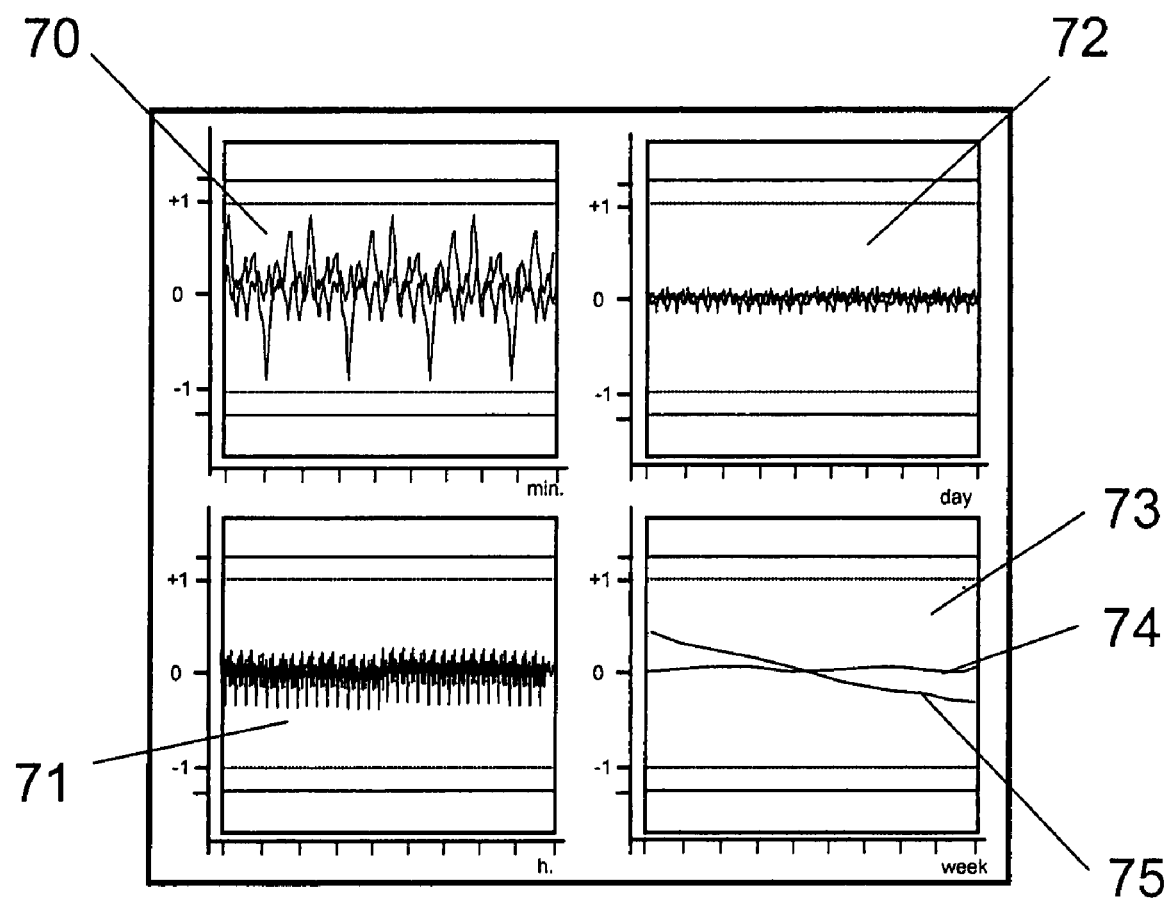
FIG. 6 shows a view of a minutes, an hours, a days and a weeks time series for two further measurement channels.

FIG. 6 shows in a similar manner to FIG. 5 graphs of test blocks with here in each case a minutes graph 70, an hours graph 71, a days graph 72 and a weeks graph 73 for two measurement channels which are combined together in a reference group. The two measurement channels respectively detect a vibration identification number in respect of a shaft bearing assembly. As can be seen from FIG. 6 the curves of the minutes graph 70, the hours graph 71 and the days graph 72 are of a usual horizontal configuration. In that respect the system does not establish any striking considerations in the short-time range and in the region of average time intervals. All state values are within the respective good value extents. In contrast in the long-term range of the weeks graph 70 which includes 60 weeks values, it can be seen that the two measurement channels behave differently. While the curve identified by reference 74 in respect of the state values of the first measurement channel extends substantially horizontally, the curve 75 for the second measurement channel has a degressive gradient. Although the curve 75 is still within the good value extent, the system detects that the bearing assembly in question is experiencing a change in its properties, which requires the initiation of maintenance steps. Accordingly, the method according to the invention of monitoring technical processes or the expert system designed in accordance with the invention make it possible to predictively detect that maintenance work is impending, in which respect that knowledge is already available before measurement value or state value limits are exceeded.

FIG. 7 again shows graphs of test blocks of respective pluralities of measurement channels, wherein the curves of the state values of the time series are standardised on the respective state base value, as in FIGS. 5 and 6, in order to ensure that all measurement channels of the reference group can be clearly represented in a graph with a predetermined time base. The standardised minutes graph is identified by reference 80, the standardised hours graph by reference 81 and the standardised days graph by reference 82. In the hours graph reference 84 gives precisely the state value at which the state curve departs from the good value extent. As already described hereinbefore an alarm is thereupon triggered by the system. As already described with reference to FIG. 4, the method according to the invention then provides that the validity flag of the state value is also set to 0, that is to say that state value and all following state values outside the good value extent are identified as invalid with the validity flag. That in turn has the result that those excluded state values are also classified as invalid, for the higher time series. In that respect no alarm is triggered in the higher time series by the value exceeding the good value extent in the lower time series.

Figure 7:
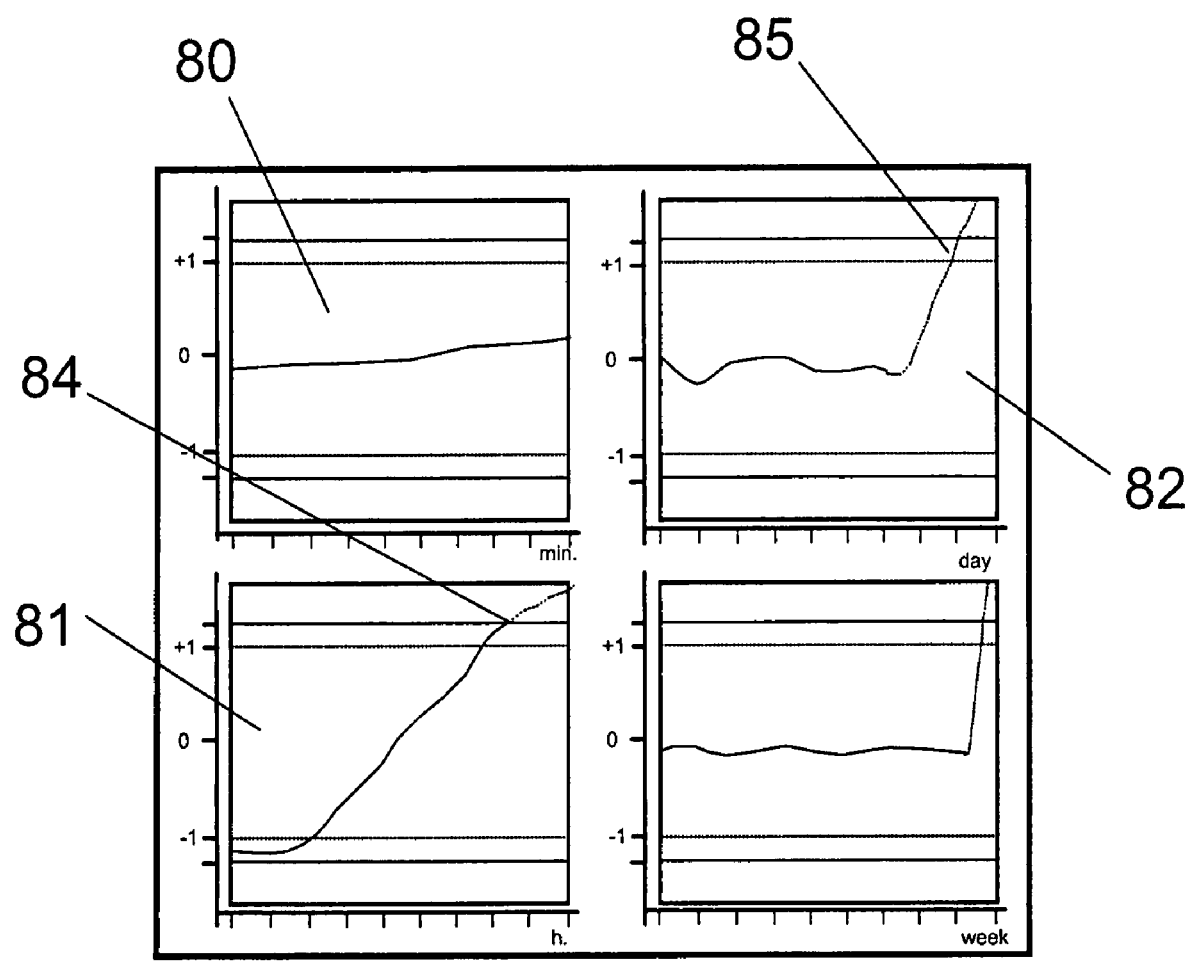
FIG. 7 shows a view of a minutes, an hours and a days time series for a further measurement channel.

As can be seen from FIG. 7 in the days graph 82 the state value curve also leaves the good value extent at point 85. The moment of exceeding the limit however differs from that in the hours graph 81. The fact that the measurement values of that state curve are invalid as at that time they are outside the good value extent in the hours graph 81 means that no alarm is triggered in the days graph 82 when the limit value is exceeded. That therefore ensures that, due to an individual event, for example a failure which is being heralded in a bearing assembly, an alarm is triggered only in an individual time series, but not in the subsequent time series of the measurement channel. That prevents unnecessary and irrelevant alarms being produced. That is achieved in that, in the described embodiment, the state values which are identified as invalid are introduced into the subsequent time series, but here triggering of an alarm is blocked as the state values which are passed to the next time series are identified as invalid and in that respect remain disregarded in terms of the check implemented to ascertain whether the good value extent was exceeded.

Figure 8:
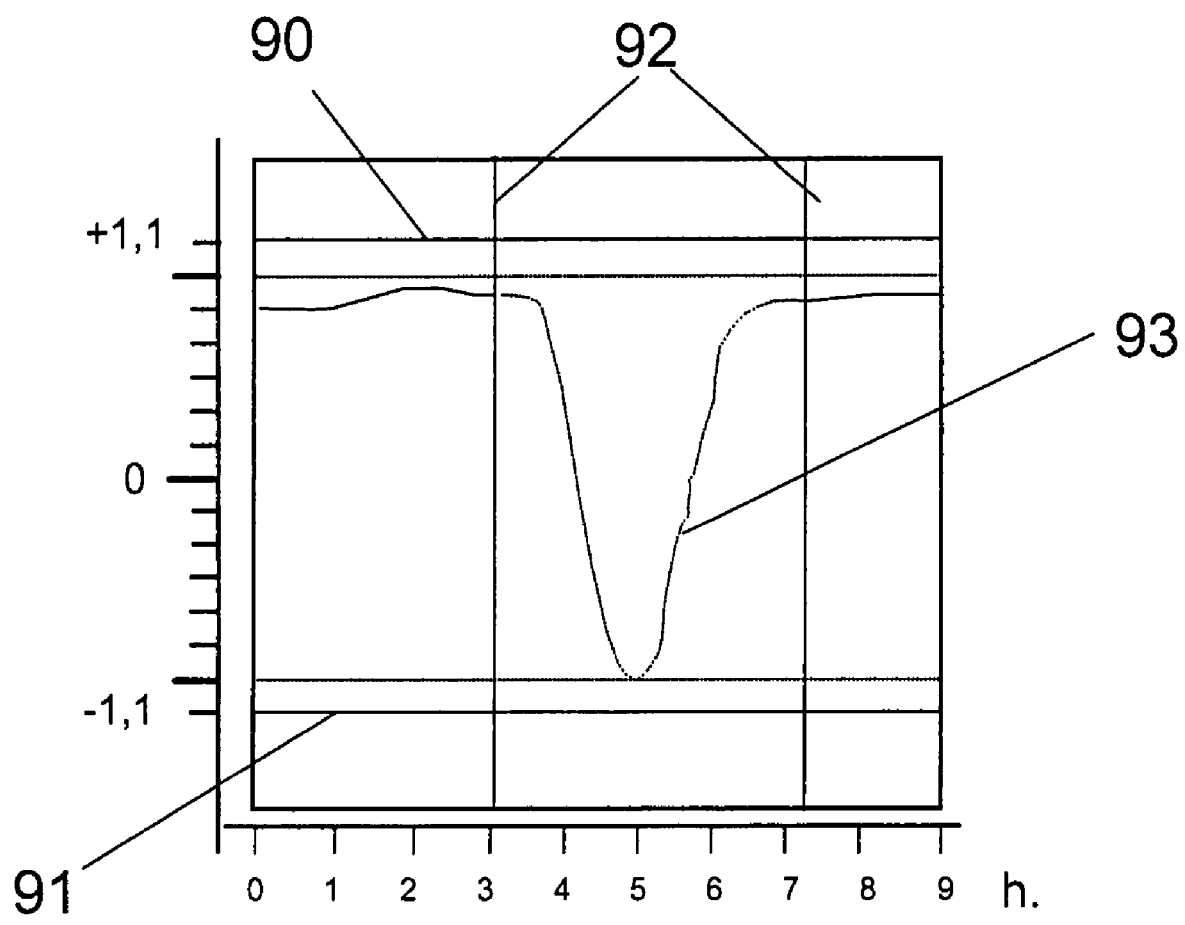
FIG. 8 shows a view of a minute time series for another measurement channel.

FIG. 8 shows a standard value graph in which the state values in the test block are standardised as in FIG. 7 in such a way that the standardised limit value range (standard range) is established by the range between the values ±1. The upper boundary of the good value extent is identified by reference 90 and the lower boundary thereof by reference 91. The limit lines of the good value extent have an ordinate value of ±1.1. The state value curve 93 illustrated in the graph exhibits a substantially horizontal configuration which collapses at a given moment in time and then goes back to a substantially horizontal configuration again. In the described embodiment of the method according to the invention and the expert system according to the invention, it is provided that markings can be set in user-specific fashion within the state value curve in order to identify measurement values which are recognised by the system as being valid, as invalid manually. The vertical marking lines are identified in the graph by reference 92. The state values between the vertical lines 92 are established by the marking as being invalid, that is to say the validity flag of the state values in question is set to 0. In that way, in particular operational disturbances which occur in the learning phase can be masked out for the evaluation procedure, that is to say for establishing the limit value range or the good value range. Otherwise the values for the limit value range and the good value range respectively, which are ascertained during the learning phase, would be falsified. The use of those falsified values in the monitoring phase would then have the result that failure indications could not be recognised, which in the worst-case scenario could result in destruction of the installation or the machine.

If by way of example the state value curve 93 shown in FIG. 8 represents a pressure signal, the value of which fluctuates in operation between 7.5 bars and 8 bars, then the good value range would be 0.5 bar, without taking an offset into consideration. If now a collapse as shown in FIG. 8 occurs due to a damaged sensor, in which case the sensor signal jumps temporarily to 0, that involves a good value extent of 0 bar to 8 bar, without taking the offset into account. If however as described the disturbance which occurred in the learning phase is masked out, the true good value range of 0.5 bar can be ascertained.

Figure 9:
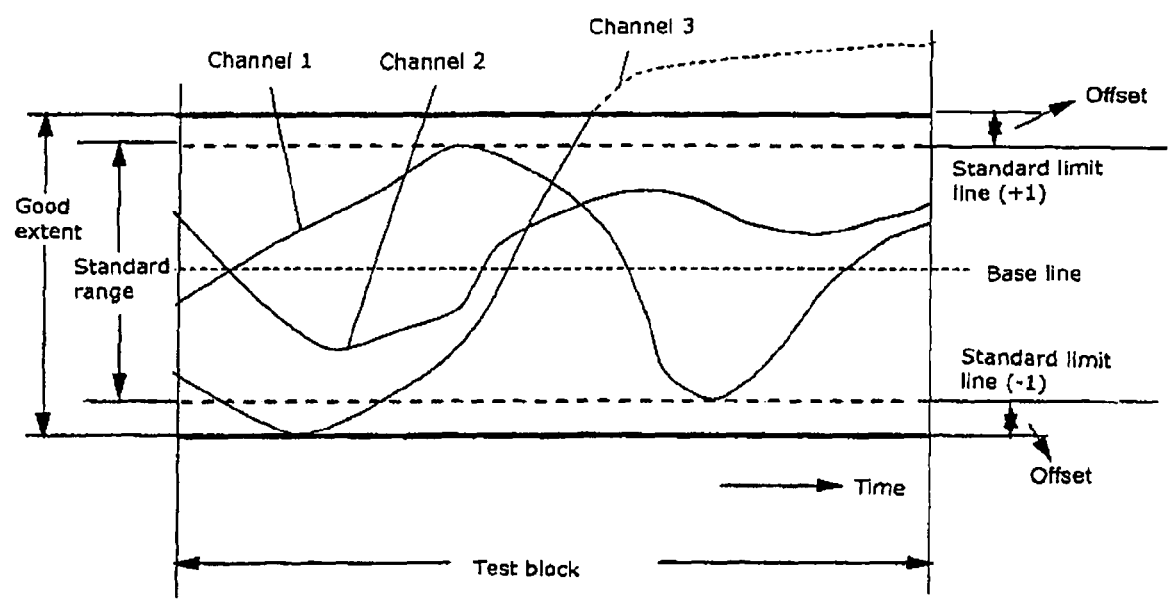
FIG. 9 shows a view of a time series for three further measurement channels.

FIG. 9 shows a further standard value graph in which standardised state values of three measurement channels are shown, which can belong to a common reference group. On the other hand however measurement channels of difference reference groups can be simultaneously reproduced and displayed in a standard value graph of that kind. By means of such a standard value graph it is possible for example state values of a plurality of measurement channels which are based on different physical parameters such as temperature, pressure, through-flow, rotary speed and so forth, to be compared together. The curve channel 1 of the first measurement channel shows a temperature pattern, wherein the temperature range fluctuates in operation between 475 and 525° C. That corresponds to a range of 50° C. with a state base value of 500° C. The curve channel 2 shows a further measurement channel which reproduces the variation in a pressure value which in operation fluctuates between 18 bars and 22 bars. In that respect the state range is 4 bars with a state base value of 20 bars. The curve channel 3 represents a further measurement channel showing the variation in a through-flow value, wherein that flow fluctuates in operation between 0.5 and 0.7 m/min. Here the state range is 0.2 m/min with a base value of 0.6 m/min. In the example shown in FIG. 9 the base values are once again calculated as in the preceding examples by averaging of the maximum and minimum values within a time series (test block). In order to represent such measurement channels with greatly different measurement ranges in a common data space and to process data, the state values of the channels are represented in a common standard value graph. In that respect the state values of the different channels are converted in such a way that the limit lines of the good value extents of the measurement channels are in the form of horizontal straight lines and for all measurement channels in a time series are always on the same level, wherein the upper standard limit line assumes the value +1 and the lower standard limit line assumes the value −1. The base line which specifies the standardised state base value is in that case set to 0.

In the case of each fresh valid measurement or state value which is passed to a test block the graph is calculated afresh. As shown in FIG. 4 the test block storage means 51-55 are connected to the output devices 56-60 for graphic output of the standard value graphs. For re-calculation of the standard value graph in the display device 56 the test block storage means 51 supplies the measurement values of the test block, the currently prevailing maximum value, the currently prevailing minimum value as well as the currently prevailing base value as described hereinbefore with reference to FIG. 4. In the illustrated embodiment the current base value is the average value of the current maximum value and the current minimum value of the respective time series. The standardised state values ZN are calculated by way of the formula set forth hereinbefore. If such a state standard value ZN is greater or smaller than 1 then ZN is outside the standardised limit value range (standard range). The good value range is calculated from the limit value range and an offset so that the standardised good value extent is between ±(1+standardised offset). The fact that the measurement values are reproduced as described in the same data space facilitates representation and data processing in the method according to the invention of monitoring technical processes. In FIG. 9 the curve channel 3 passes out of the good value extent, whereby an alarm is triggered and a predetermined monitoring-related step is executed.

After the supply of a fresh state value in one of the time series (minutes, hours, days, weeks and years test blocks) the respective standard graph can be calculated, whereby the current condition of the process is always displayed for the various time series. By way of example it can be at a given moment in time that, in the years test block which in the described embodiment embraces a time extent of 5 years, a fresh weeks value is introduced. That weeks value is the valid average value of all valid measurement values which are detected in that period of time. Accordingly the state history is updated with each fresh state value introduced in the respective test block. If the state value which is freshly incorporated into the respective test block is a new maximum value or a new minimum value, the base value is also updated. Ultimately the result is a sliding state image of the underlying process. In the example shown in FIG. 9 the measurement values of the channel 1 touch the standard limit lines ±1. That indicates that, by virtue of the operating conditions, the limits ascertained during the learning phase are fully utilised in operation. In contrast the maximum value and the minimum value of the curve in channel 2 are far away from the limits of the standard range so that this involves a quiet phase of operation in which the machine parts are less highly stressed. The curve of the state values of channel 3 passes from the inside outwardly through the upper standard limit line +1 in the FIG. 9 graph so that an alarm is produced. Depending on which time range forms the underlying basis, that signals a failure which is soon to occur or points to necessary maintenance.

It is to be noted that the method according to the invention of monitoring technical processes and the associated expert system have been described with reference to a simple example in which one and six temperature values respectively were detected and the moment in time is established by means of data processing, at which monitoring-related steps are to be triggered such as the output of an indication for observation, the output of a warning indication, the output of a control signal and so forth. As the man skilled in the art will realise the idea according to the invention can also be applied in particular to complex technical processes such as production machines and installations with in principle any number of measurement channels. Reliable information about the state of the installations can be afforded by trend curves and by observation and warning lists, and the necessary steps initiated automatically. By virtue of detecting anomalies which occur in the medium term or in the long term, in the configuration in respect of time of the time series of the measurement channels, impending crashes can be predicted and the time for maintenance operations can be established so that it is possible to achieve longer running times. A further advantage of the invention also lies in the possibility of conducting research into the cause of problems which arise. Gap-less recording of the development in the measurement channels with different time bases make it possible to arrive at conclusions on the basis of detected changes.

During the learning phase the installation/machine operates in the normal operating mode so that no operational stoppages are generally caused by the invention. As soon as the different operating states of trouble-free normal operation have been recognised in the learning phase the monitoring phase can then be enabled.

| List of references | |
|---|---|
| 10 | expert system |
| 11 | measurement unit |
| 12a)-f) | temperature sensors |
| 13 | PC |
| 14 | drive shaft |
| 15a)-f) | bearing assembly |
| 16a), b) | gear |
| 17 | electric motor |
| 20 | validity module |
| 22 | test block production module |
| 23 | test block storage module |
| 24 | trend output module |
| 26 | evaluation module |
| 28 | module for initiating monitoring-relevant steps |
| 29 | database |
| 32 | unit of the minutes test block |
| 33 | unit of the hours test block |
| 34 | unit of the days test block |
| 35 | unit of the weeks test block |
| 36 | unit of the years test block |
| 37 | machine |
| 38 | line |
| 39 | measurement data detection apparatus |
| 40 | measurement data-processing unit |
| 41 | validity test unit |
| 46, 47, 48, 49, 50 | functional unit for ascertaining the respective limit range in the learning phase and for detecting when a value exceeds the good value extent in the monitoring phase respectively |
| 51, 52, 53, 54, 55 | test block storage means |
| 56, 57, 58, 59, 60 | display device |
| 65 | minutes graph |
| 66 | hours graph |
| 67 | days graph |
| 68 | upper boundary line of the limit value extent |
| 69 | lower boundary line of the limit value extent |
| 70 | minutes graph |
| 71 | hours graph |
| 72 | days graph |
| 73 | weeks graph |
| 74 | state value curve of the first measurement channel in the weeks graph |
| 75 | state value curve of the second measurement channel in the weeks graph |
| 80 | standardised minutes graph |
| 81 | standardised hours graph |
| 82 | standardised days graph |
| 84 | state value on the good value limit |
| 90 | upper limit line of the good value extent |
| 91 | lower limit line of the good value extent |
| 92 | marking line |
| 93 | state value curve |
| GS | limit value range |
| GWS | good value range |
| Max | maximum state value of a time series |
| Min | minimum state value of a time series |
| OS | offset |
| ZB | state base |
| ZN | standard state value |
| ZW | state value |

The invention claimed is:

1. A method of monitoring technical processes in machines comprising:
   detecting measurement data by way of at least one measurement channel;
   processing said measurement data of a measurement channel in a plurality of time series of state values with mutually different time bases; determining limit value ranges in a learning phase;
   triggering monitoring-related steps in a monitoring phase when limit values are exceeded wherein in the monitoring phase a good value extent of the state values is calculated for a time series with an upper and a lower limit value, with the inclusion of a limit value range which is predetermined in the learning phase and a state base value of the time series, which is determined in the monitoring phase.

2. A method as set forth in claim 1 wherein the upper and the lower limit value of the time series is calculated by adding or subtracting half the limit value range to or from the state base value of the time series respectively.

3. A method as set forth in claim 1 or claim 2 wherein a time series includes a predetermined number of values and the state base value of the time series is calculated in the monitoring phase by data processing of at least two currently prevailing good values of the time series.

4. A method as set forth in claim 1 wherein said state values of a time series are standardised on to the state base value.

5. A method as set forth in claim 4 characterised in that the standardised state values of a plurality of time series with the same time base are represented in a common standard value graph.

6. A method as set forth in claim 1 wherein a predetermined good value range of a time series is calculated from the limit value range ascertained in the learning phase and an offset.

7. A method as set forth in claim 6 characterised in that the limit value range of a time series is established by the range of fluctuation in the state values of the time series in the learning phase.

8. A method as set forth in claim 1 wherein in relation to a measurement channel in the learning phase a state value of the time series with the lowest time base is continuously ascertained and incorporated into the time series and/or in the monitoring phase a good value of the time series with the lowest time base is continuously ascertained and incorporated into the time series.

9. A method as set forth in claim 8 wherein classifying the freshly ascertained value in the respective time series the oldest value is removed from the time series when a number of classified values which is predetermined for the time series has been reached.

10. A method as set forth in claim 8 wherein in the monitoring phase upon the occurrence of a state value in a time series with a predetermined time base which is outside the good value extent a monitoring-related step is outputted.

11. A method as set forth in claim 10 wherein a parameter which is dependent on the predetermined time is detected, and a predetermined monitoring-related step is outputted in dependence on said parameter.

12. A method as set forth in claim 10 wherein after the occurrence of a state value in the time series, which is outside the good value extent, the subsequently ascertained state values of a time series are rejected as invalid until a state value is in a value interval which is established solely by the limit value range and the state base value of the time series.

13. A method as set forth in claim 8 wherein in the monitoring phase a state value of a time series, which is outside the good value extent, is not used for ascertaining a state value of the time series with a higher time base.

14. A method as set forth in claim 1 wherein in relation to a measurement channel in the learning phase a state value of a time series with a predetermined time base is ascertained by statistical evaluation of state values of the time series with a lower time base and is incorporated into the first-mentioned time series and/or in the monitoring phase a good value of a time series with a predetermined time base is ascertained by statistical evaluation of good values of the time series with a lower time base and is incorporated into the first-mentioned time series.

15. A method as set forth in claim 14 wherein only after the presence of a predetermined minimum number of good values in the monitoring phase or state values in the learning phase within the time interval of a time series that a valid good value or a state value for the next higher time series is calculated.

16. A method as set forth in claim 1 wherein for a time series there is established a minimum state range which replaces the limit value range ascertained in the learning phase when the latter is less than the minimum state range.

17. A method as set forth in claim 1 wherein state values of a hybrid channel are formed by forming the difference of measurement data from physically correlated measurement channels.

18. A method as set forth in claim 17 wherein the state values of a hybrid channel are processed in a plurality of time series of state values with mutually different time bases.

19. A method as set forth in claim 1 wherein state values of a hybrid channel are formed by forming the sum of measurement data from physically correlated measurement channels.

20. A method as set forth in claim 1 wherein at least two items of information are associated with each state value of a time series.

21. An expert system for monitoring technical processes comprising:
   at least one measurement channel which has sensor, line and evaluation means for detecting measurement data;
   data processing means for processing the measurement data and for ascertaining a plurality of time series of state values with different time bases from the measurement data;
   storage means for storing the time series of state data, wherein in a learning phase limit value ranges of the time series can be calculated and stored; and
   a monitoring means for carrying out a monitoring-related step;
   a display means for displaying that a state value has exceeded a limit value in a monitoring phase,
   wherein the data processing means in the monitoring phase for a time series calculates a good value extent with an upper and a lower limit value with the incorporation of a limit value range which is predetermined in the learning phase; and
   a state base value of the time series, which is determined in the monitoring phase.

22. An expert system as set forth in claim 21 characterised in that state values are provided with a time mark.

23. A computer program product which is stored on a non-transitory storage medium and which can be loaded into a memory of a computer and which includes software code portions with which a method as set forth in claim 1 is carried out when the product runs on the computer.

* * * * *